(12) United States Patent
Buchmann et al.

(10) Patent No.: US 10,989,586 B2
(45) Date of Patent: *Apr. 27, 2021

(54) LABORATORY BALANCE WITH A MOTORIZED SLIDING TOP WALL OF THE DRAFT SHIELD

(71) Applicant: Mettler-Toledo GmbH, Greifensee (CH)

(72) Inventors: Alice Buchmann, Uster (CH); Beat Meister, Naenikon (CH); Martin Vogt, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 116 days.

This patent is subject to a terminal disclaimer.

(21) Appl. No.: 16/381,532

(22) Filed: Apr. 11, 2019

(65) Prior Publication Data

US 2019/0316956 A1    Oct. 17, 2019

(30) Foreign Application Priority Data

Apr. 17, 2018 (EP) .................................. 18167735

(51) Int. Cl.
*G01G 21/22* (2006.01)
*G01G 21/28* (2006.01)

(52) U.S. Cl.
CPC ........... *G01G 21/286* (2013.01); *G01G 21/22* (2013.01)

(58) Field of Classification Search
CPC .............................. G01G 21/286; G01G 21/22
USPC ................................................................ 177/1
See application file for complete search history.

(56) References Cited

U.S. PATENT DOCUMENTS

| 4,700,793 | A | 10/1987 | Lüchinger | |
|---|---|---|---|---|
| 6,246,018 | B1 | 6/2001 | Schink | |
| 6,603,081 | B2 * | 8/2003 | Luchinger | G01G 21/28 177/126 |
| 6,849,809 | B2 | 2/2005 | Lüchinger et al. | |
| 6,909,058 | B2 * | 6/2005 | Luchinger | G01G 21/286 177/180 |
| 7,423,226 | B2 * | 9/2008 | Rotach | G01G 23/30 177/180 |
| 7,732,720 | B2 * | 6/2010 | Olesen | G01G 21/286 177/180 |
| 7,834,278 | B1 * | 11/2010 | Zeiss | G01G 21/286 177/180 |
| 8,294,046 | B2 | 10/2012 | Lüchinger et al. | |
| 9,464,932 | B2 * | 10/2016 | Wang | G01G 21/286 |

(Continued)

FOREIGN PATENT DOCUMENTS

DE    202007016933 U1    11/2008

*Primary Examiner* — Jacques M Saint Surin
(74) *Attorney, Agent, or Firm* — Standley Law Group LLP; Jeffrey S. Standley; Stephen L. Grant

(57) ABSTRACT

A draft shield (5") is provided for a laboratory balance (1) with a base body (2), a weighing chamber (10) with a weighing chamber floor (3) and a weighing chamber rear wall (4). The draft shield has a top wall (6), first and second side walls (7, 8) and a front wall (9). The draft shield, the weighing chamber floor and the weighing chamber rear wall enclose the weighing chamber. A drive unit (19) connected to the top wall serves to open and close the top wall (6). The weighing chamber rear wall has a base module (15) and a top module (16"), at least a portion of which is configured as a compartment. The drive unit is arranged in the compartment-shaped portion.

11 Claims, 15 Drawing Sheets

(56) References Cited

U.S. PATENT DOCUMENTS

| | | | |
|---|---|---|---|
| 2015/0198476 A1* | 7/2015 | Wang | G01G 21/286 |
| | | | 177/238 |
| 2015/0204716 A1* | 7/2015 | Lewandowski | E05F 15/632 |
| | | | 177/180 |
| 2019/0316954 A1* | 10/2019 | Buchmann | G01G 21/286 |

* cited by examiner

LABORATORY BALANCE WITH A MOTORIZED SLIDING TOP WALL OF THE DRAFT SHIELD

CROSS-REFERENCE TO RELATED APPLICATIONS

This application makes a claim of priority to European Patent Application No. 18167735.2, filed on 17 Apr. 2018, which is incorporated by reference as if fully recited herein.

TECHNICAL FIELD

The invention concerns a balance that is used to weigh small objects with a very high precision of, typically, a fraction of a milligram. The sensitivity which enables a balance to measure weight so precisely also makes the balance susceptible to any air circulation in the area of the weighing pan. The weighing pan and the space above it are therefore separated from the ambient environment by an enclosure, commonly referred to as a draft shield, which is normally equipped with one or more wall panels that can be opened and closed in the manner of sliding doors. The space inside the draft shield is referred to as the weighing chamber. The term laboratory balance in the present context means any high-precision weighing instrument with a draft-shield-enclosed weighing chamber. Such balances are used in chemical and pharmaceutical laboratories, industrial quality control, the jewelry trade, numismatics, weighing of air-pollution filters, and many other applications.

The present invention is focused on a subcategory of laboratory balances, wherein the opening and closing movements of at least one of the sliding doors of the draft shield are driven by a motor which may be controlled for example by keyboard commands of a human operator or by an applications program of a laboratory robot or other automated system. Motorized draft shields belong to the established state of the art and have become a common feature of laboratory balances of the highest precision, which are also referred to as analytical balances.

Within this context, the present invention is directed specifically at a motor drive mechanism for actuating the sliding movements to open and close a horizontal ceiling panel (referred to herein as top wall) of the draft shield. Of particular interest are a modular design configuration of a motor drive unit for the top wall as well as the arrangement and location of the motor drive unit within the basic design architecture of a laboratory balance, with a view to optimizing the logistics of manufacturing and servicing laboratory balances.

BACKGROUND ART

A state-of-the-art draft protection device for a laboratory balance described in US 2010/0288566 A1 has planar panels, i.e. a rear wall, a front wall, two sidewalls, a top cover, and a floor, which together enclose a weighing chamber. The front wall and sidewalls are suspended from the edges of the top cover and overhang the front and sides of a base housing of the balance. The top cover with the suspended front- and sidewalls can be raised and lowered, with the front- and sidewalls sliding up and down over the front and sides of the base housing, whereby the height of the weighing chamber can be adjusted. The sidewalls are horizontally slidable along the guide tracks from which they are suspended. The possibility of a drive motor for the horizontal movement of the sidewalls and the vertical movement of the top cover panel is mentioned. However, the question of horizontal mobility for the top cover panel is not addressed.

As another example for the current state of the art, an analytical balance according to U.S. Pat. No. 6,849,809 B2 has a draft shield with sliding side wall panels and a sliding top cover panel that are actuated by a motor drive mechanism, wherein the latter is installed in a housing that is arranged adjacent to the draft shield, particularly in the top compartment of the housing. The side wall panels and the top cover panel have individual clutch elements connecting them to the one motor drive mechanism. The main focus in U.S. Pat. No. 6,849,809 B2 is on a concept of integrating a sliding guide of the top cover panel into a carrying handle of the balance.

In regard to the area that is of particular interest in the present invention, i.e. an optimal design arrangement for a motor drive mechanism for actuating the sliding movements to open and close a sliding top wall of the draft shield, the applicant has found no information in the prior art. Therefore, the object of the present invention is to provide a laboratory balance with an arrangement for the motorized drive mechanism of the sliding top wall of the draft shield, wherein said arrangement is optimized from a manufacturing and servicing point of view.

SUMMARY

This task is solved by a laboratory balance with a draft shield having a movable top wall panel actuated by a motor unit that is arranged in accordance with the independent claim. Advantageous embodiments and detail features of the invention are set forth in the dependent claims.

A laboratory balance of the type to which this invention relates has a base body, a weighing chamber with a weighing chamber floor and a weighing chamber rear wall, a draft shield with a top wall, a first side wall, a second side wall arranged parallel to the first side wall, and a front wall. The weighing chamber floor, the draft shield and the weighing chamber rear wall together enclose the weighing chamber. A drive unit is operatively connected to the top wall and serves to actuate opening and closing movements of the top wall. According to the invention, the weighing chamber rear wall of the laboratory balance is of a modular design having a base module and a top module with the base module connected to the base body and the top module connected to the top wall of the draft shield. At least a portion of the top module of the weighing chamber rear wall is configured as a compartment, and the drive unit is arranged in said compartment-shaped portion of the top module of the weighing chamber rear wall. This arrangement ensures effective utilization of the available space besides reducing the number of moving parts in the balance.

The terms front, rear, side, top, floor within the present context relate to the weighing chamber as it presents itself to a user of a balance that is set up in its operating condition. The spatial directions and dimensions are accordingly defined as width, height and depth as seen by a person sitting in front of the balance. The direction from the weighing chamber to the housing is defined as the longitudinal or front-rear direction of the laboratory balance. A transverse direction is defined horizontal and perpendicular to the longitudinal direction.

In preferred embodiments of the invention, the drive unit is arranged in a transverse orientation and substantially enclosed within the compartment-shaped portion of the top module of the weighing chamber rear wall. Enclosing the drive unit within the weighing chamber rear wall makes the laboratory balance more compact. In addition, the drive unit is positioned spatially proximate to the top wall there by reducing the number of parts needed to induce movement in the top wall.

In preferred embodiments of a laboratory balance with a modular rear wall of the weighing chamber, the drive unit is arranged in a transverse orientation and substantially enclosed within the top module of the weighing chamber rear wall. The top module acts as a shield protecting the sensitive components in the drive unit from the adversarial effects of dust, moisture, and corrosive chemicals.

Preferably, the drive unit for the sliding top wall of the draft shield in a laboratory balance according to the invention includes a mounting plate, a motor, a control circuit, and a transmission unit, wherein the motor, the control circuit, and the transmission unit are installed on the mounting plate. The transmission unit is transmitting mechanical force from the motor to the first and/or second side wall. The mounting plate serves as a basic supporting framework for locating all the other components of the drive unit.

Advantageously, the mounting plate is connected to the top module, with the connection of the mounting plate to the top module being designed to positively position the drive unit in relation to the top module. The mounting plate interacts with the top module and serves to establish an engagement between the drive unit and the top module.

In preferred embodiments of the drive unit for the sliding top wall of the draft shield, the transmission unit includes at least a shaft arranged to rotate about a horizontal axis, a driven pulley that is solidly mounted on the shaft, a belt connecting the driven pulley to a driver pulley of the motor, and at least one driving member solidly mounted on the shaft. The transmission unit facilitates the transfer and delivery of power from the motor to the top wall of the draft shield.

Advantageously, the top wall of the draft shield includes at least one guide which is interactively coupled to the at least one driving member in order for the latter to apply an actuating force that moves the top wall.

In preferred embodiments, the at least one guide includes a rack which extends longitudinally along the top wall, and the at least one driving member is configured as a pinion that engages the serrations of the rack and actuates the opening and closing movements of the top wall.

In preferred embodiments of a laboratory balance according to the invention, the control circuit of the drive unit is connected to a central control unit. The control circuit is operable to receive command signals from the central control unit and to control the movements of the motor based on said command signals. Alternatively the central control unit can control the motor directly.

BRIEF DESCRIPTION OF THE DRAWINGS

The laboratory balance with the drive unit according to the invention will be described hereinafter through embodiments shown schematically in the drawings, wherein identical parts are identified by identical reference numerals and wherein:

FIG. 7B shows the underside of the sliding top wall of FIG. 7a;

DETAILED DESCRIPTION OF THE EMBODIMENTS

Figure 1:
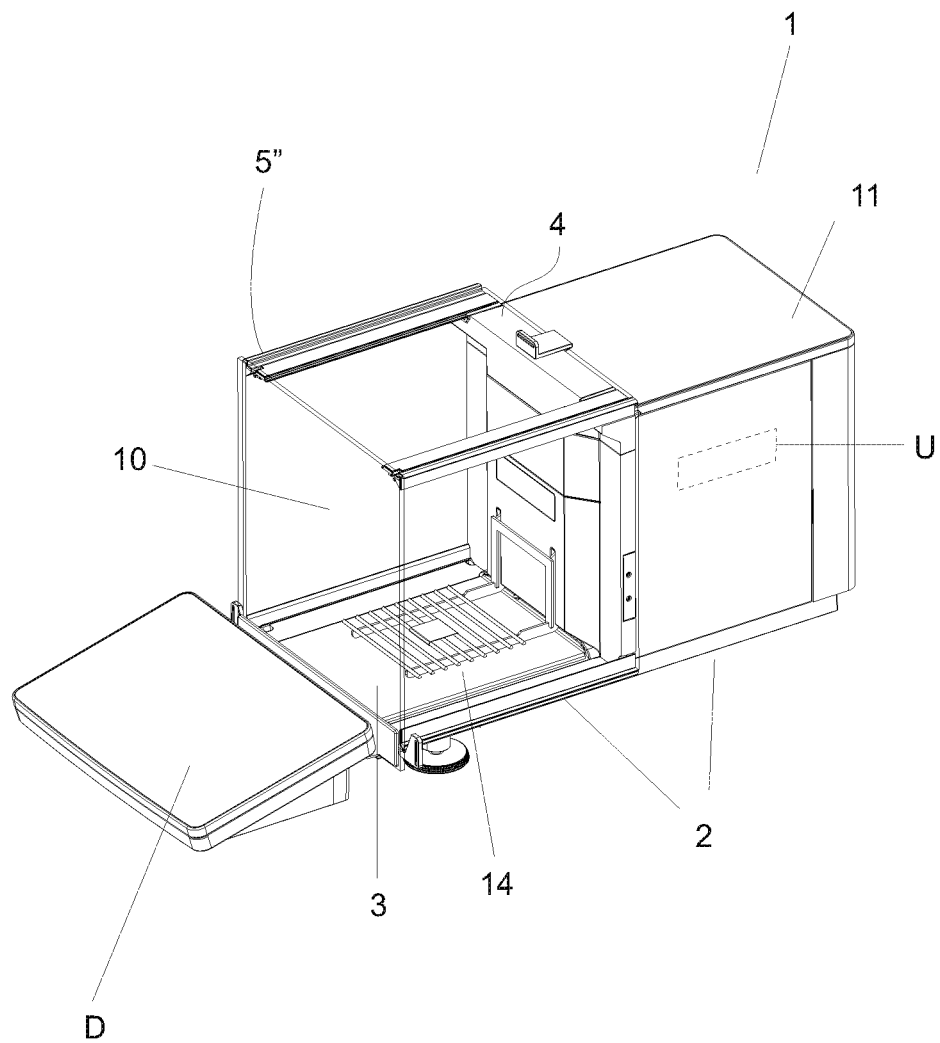
FIG. 1 represents a complete laboratory balance of the type to which the invention relates, in a perspective view.

FIG. 1 illustrates a laboratory balance 1 according to the invention in a three-dimensional view. The principal parts of the laboratory balance 1 are the display console D, the base body 2, the weighing chamber 10, and the housing 11. The weighing pan 14, shown here as a grate-shaped weighing platform 14, is enclosed inside the weighing chamber 10. The weighing platform 14 is cantilevered above the topside of the base body 2, mechanically connected to a weighing cell (not shown) which is located inside the housing 11. The housing 11 also contains the central control unit U of the balance 1. The transparent draft shield 5" which encloses the weighing chamber 10 is mounted on the base body 2 and connected to the housing 11 through the weighing chamber rear wall 4.

Figure 2:
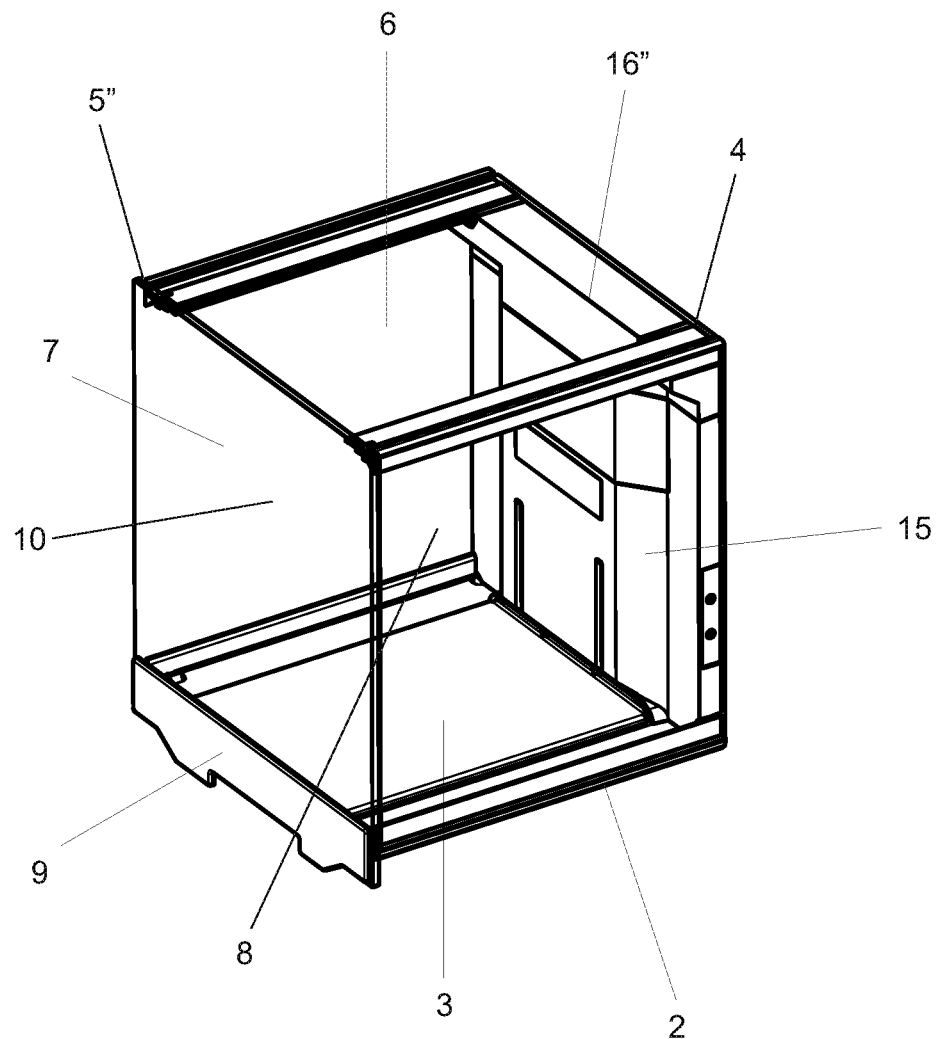
FIG. 2 shows the draft shield of the balance of FIG. 1.

FIG. 2 shows the draft shield 5" by itself, uninstalled from the balance 1. The weighing chamber 10 is enclosed by the weighing chamber floor 3, the weighing chamber rear wall 4, and by rectangular transparent draft shield panels that include a top wall 6, a first sidewall 7, a second sidewall 8, and a front wall 9. The weighing chamber rear wall 4 is of modular construction, with a base module 15 and a top module 16". The base module 15 of the weighing chamber rear wall 4 is connected to the base body 2, while the top module 16" is connected to the top wall 6 of the draft shield 5".

Figure 3:
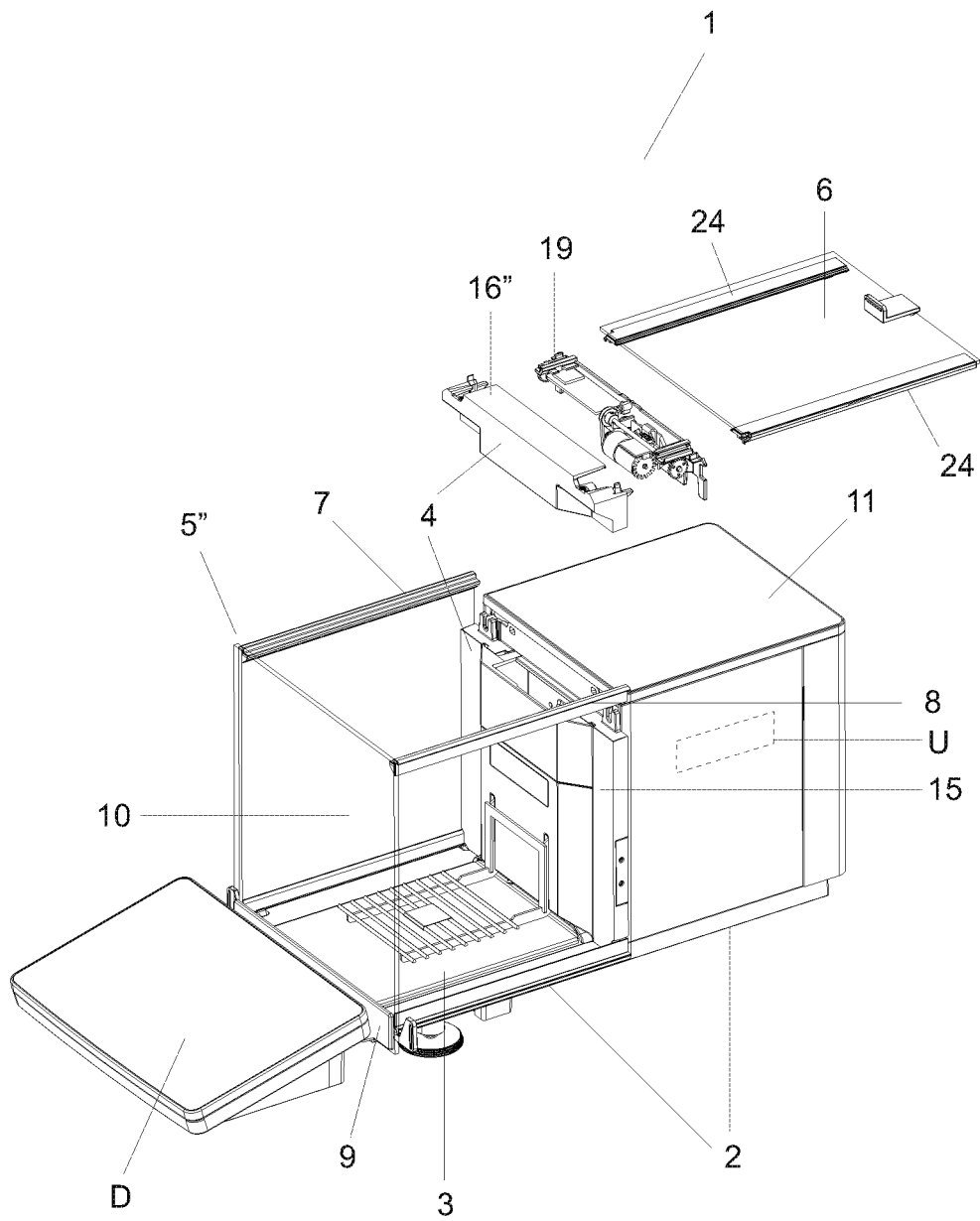
FIG. 3 represents the balance of FIG. 1, showing the top module of the rear wall, the drive unit, and the top wall panel in exploded view.

FIG. 3 represents the balance 1 of FIG. 1, wherein the top module 16" of the weighing chamber rear wall 4, the drive unit 19, and the top wall panel 6 of the draft shield 5" are separated from the balance 1 and from each other. To install the top module 16", the drive unit 19, and the top wall panel 6 in the balance 1, the drive unit 19 is first installed in the top module 16". Next, the top module 16" with the installed drive unit 19 is mounted on top of the base module 15 of the weighing chamber rear wall 4. Finally, the top wall panel guides 24 are inserted into the guide channels 68 of the drive unit 19 (see FIG. 5) and the top panel 6 is slid forward to the point where the racks 75 (see FIG. 7b) engage the pinions 62 of the drive unit 19 (see FIG. 6a). Now, if the balance is otherwise in operating condition, the top wall panel 6 is ready to be closed and opened by the drive unit 19.

Figure 4:
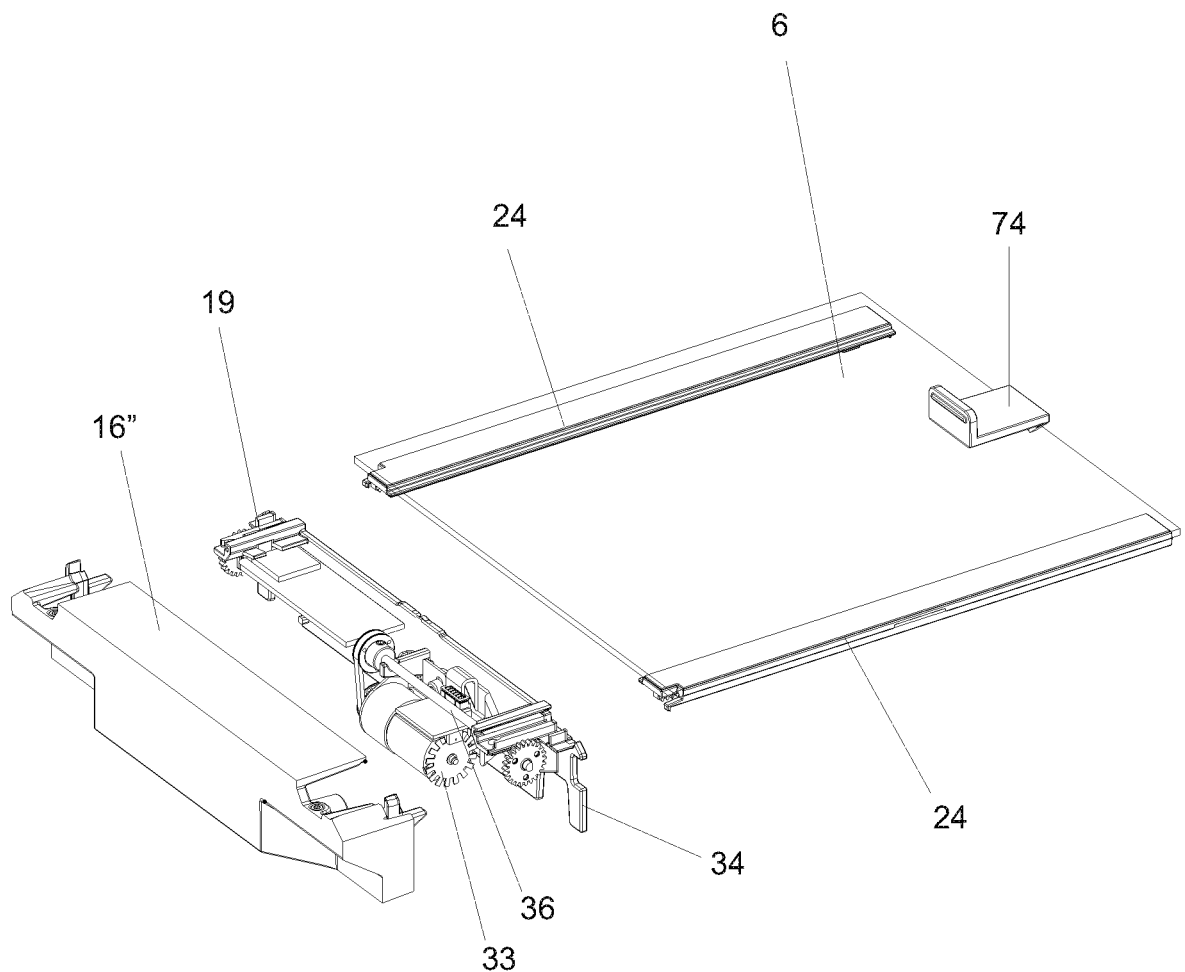
FIG. 4 represents a more detailed view of the top module of the rear wall, the drive unit, and the top wall panel.

FIG. 4 represents an enlarged detail of the exploded view portion of FIG. 3, showing components of the drive unit 19 including the motor 33, the mounting plate 34 and the transmission unit 36. As a preferred feature of the invention, this drawing illustrates in particular the transverse orientation of the drive unit relative to the longitudinal front-rear direction of the laboratory balance 1. Attached to the rearward edge of the top wall panel 6 is a slide handle 74 for the (optional) manual operation of the top wall panel 6.

Figure 5:
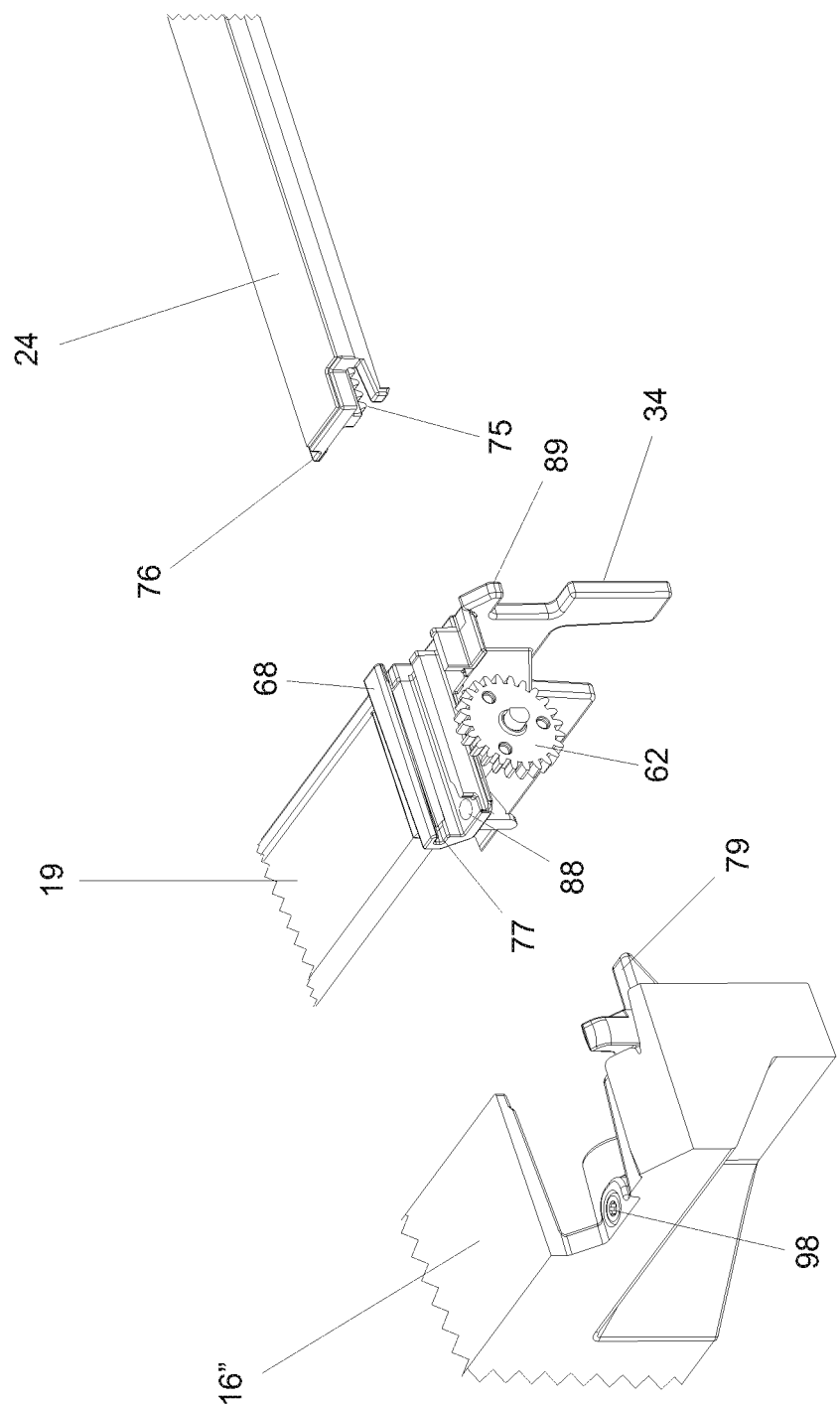
FIG. 5 represents a further enlarged fractional view of the elements shown in FIG. 4.

In a further enlarged fractional view, FIG. 5 represents the respective right-hand portions of the top module 16" and of the drive unit 19, as well as the right-hand guide 24 of the top wall panel 6. The drawing illustrates how the three parts fit together and/or are attached to each other. The installed drive unit 19 is exactly positioned relative to the top module 16", as the projection 89 of the mounting plate 34 seats itself on the projection 79 of the top module 16". The top wall guide 24 carries a rack 75 at its underside (not visible in FIG. 5) and a spline 76 along its edge. In the installed condition, the spline 76 of the top wall guide 24 slides in the groove 77 of the guide channel 68, while the pinion 62 is engaged in the rack 75.

Figure 6A:
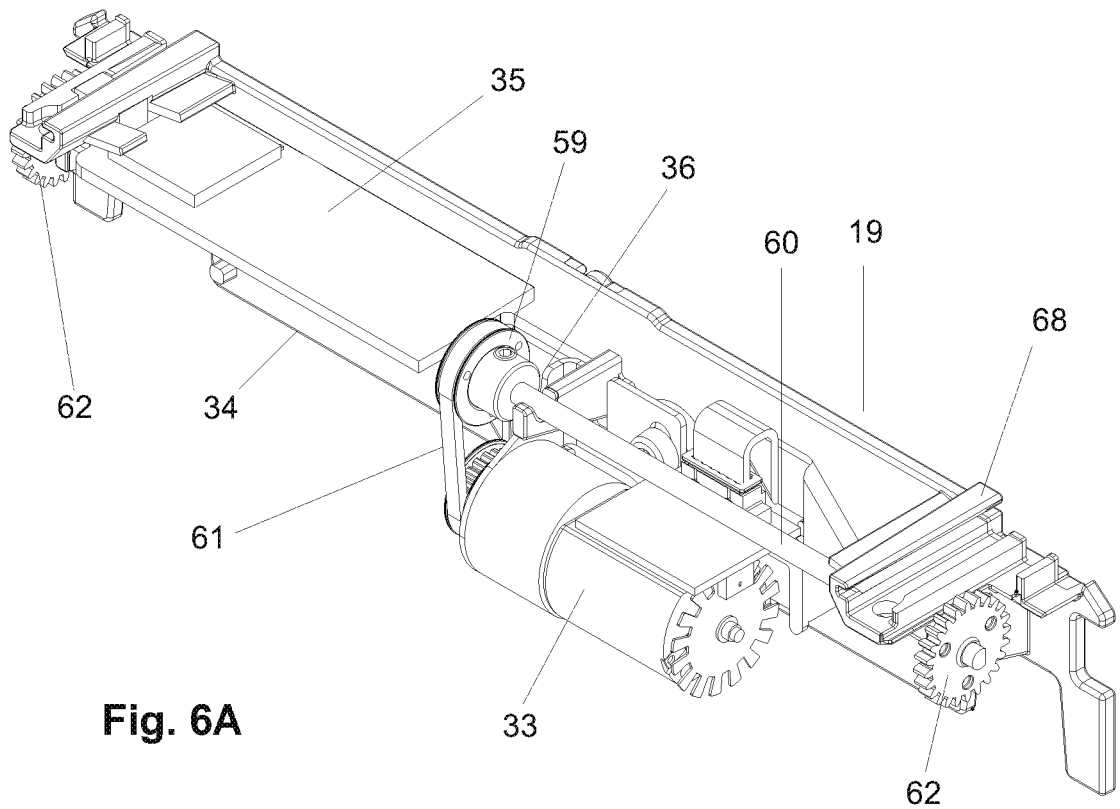
FIG. 6A represents the complete drive unit in a perspective view from the front.
Figure 6B:
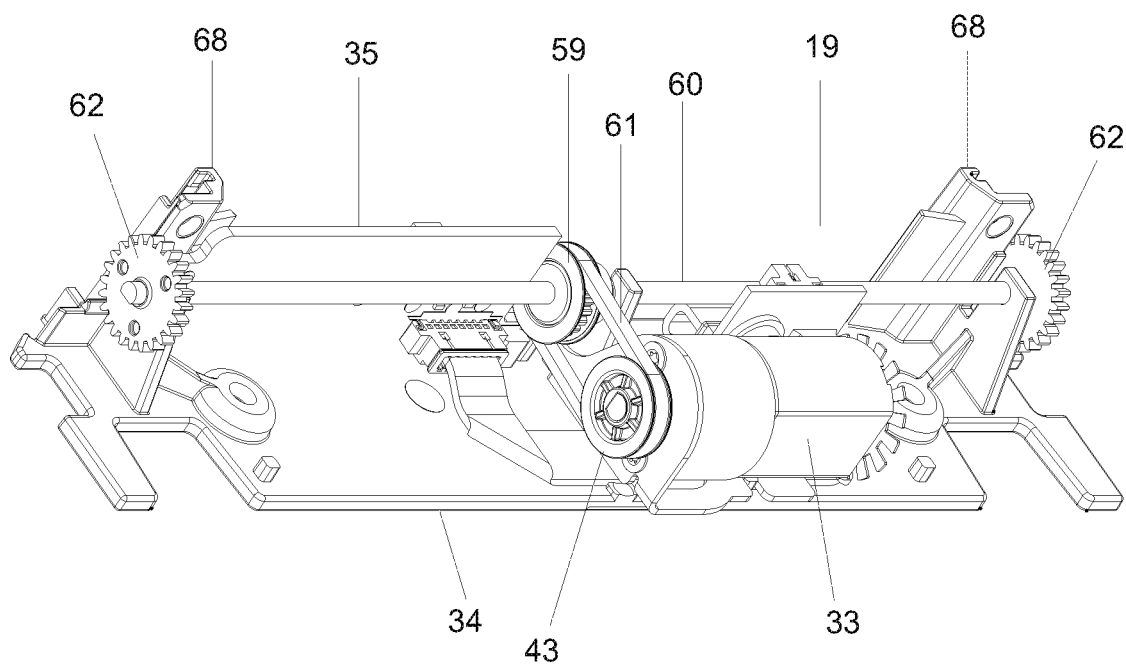
FIG. 6B represents the drive unit of FIG. 6a lying on its mounting plate.

FIG. 6a shows the drive unit 19 in a perspective frontal view, while FIG. 6b shows the drive unit 19 lying flat on its mounting plate 34. The drive unit 19 is configured as an assembly unit or module, wherein all of the components are attached to the mounting plate 34. Motive power is transmitted from the motor 33 to the top wall panel 6 by way of the drive pulley 43, drive belt 61, driven pulley 59, shaft 60, pinions 62, and rack 75. The shaft 60, driven pulley 59 and pinions 62 are collectively identified as the transmission unit 36. The motor 33 is controlled by the control circuit 35. In addition, FIGS. 6a and 6b also give a clearer view of the guide channel 68.

Figure 7A:
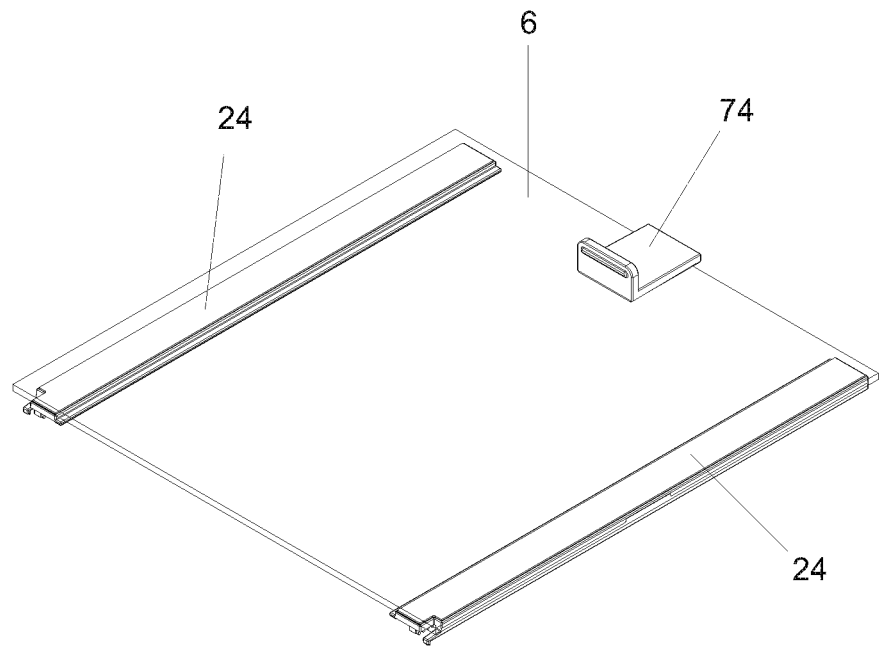
FIG. 7A represents the sliding top wall in a perspective view from the top.
Figure 7B:
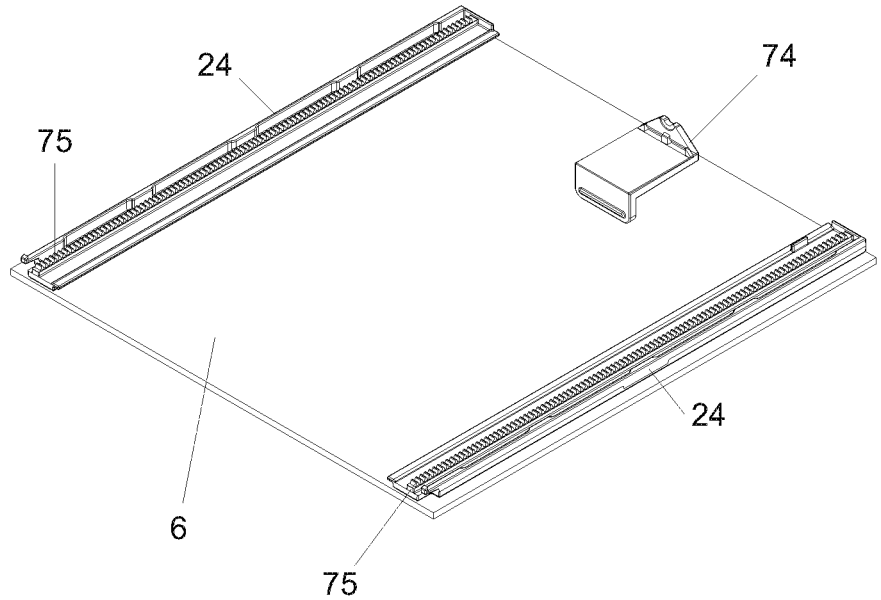

FIG. 7a shows the sliding top wall panel 6 in a perspective view from the top, while FIG. 7b shows the underside of top wall panel 6. The top wall guides 24 include the racks 75, whose function has been explained previously. As can be seen in FIG. 7b, the slide handle 74 is folded over the rear edge of the top wall panel 6 and projects from the underside of the top wall panel 6. Thus, the top wall panel 6 is prevented from moving forward beyond its closed position, as the downward projection of the slide handle 74 bumps against the top module 16" of the weighing chamber rear wall 4.

Figure 8A:
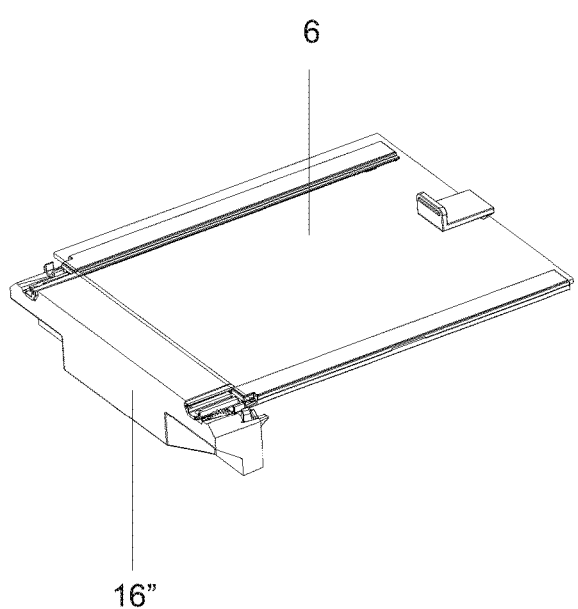
FIG. 8A shows the top module of the weighing chamber rear wall, with the top wall panel retracted and disengaged from its guide channels.
Figure 8B:
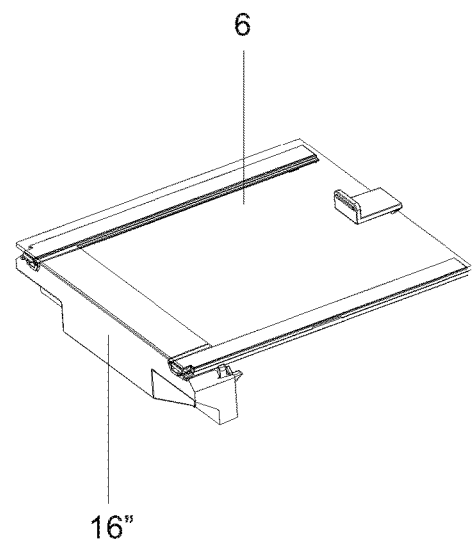
FIG. 8B shows the top wall panel of FIG. 8a in its fully open position.
Figure 8C:
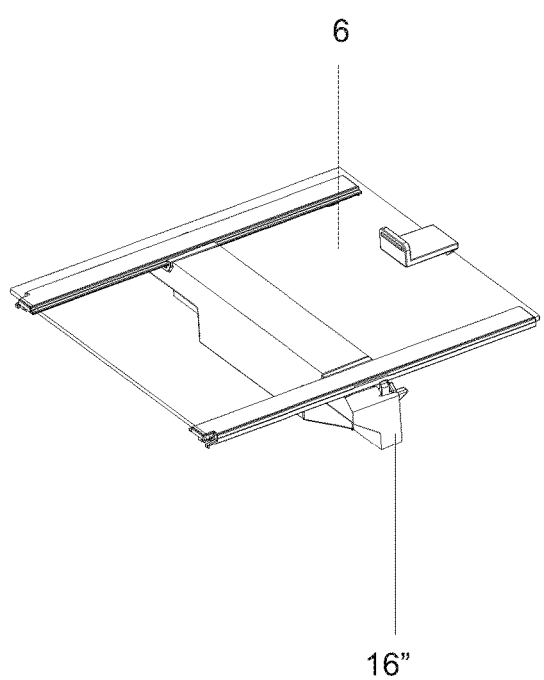
FIG. 8C shows the top wall panel of FIG. 8a in a half-open position.
Figure 8D:
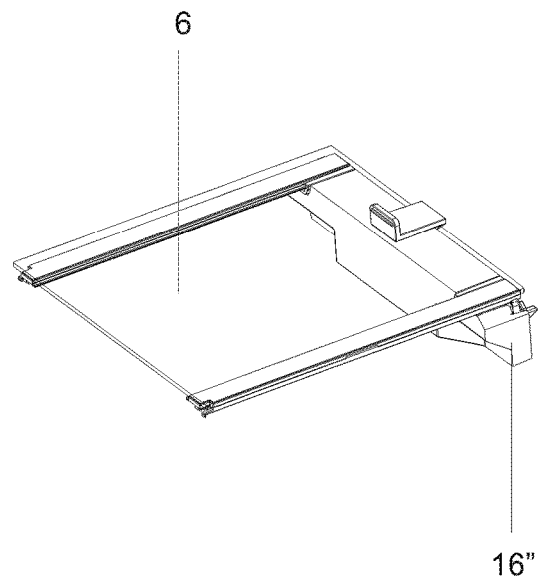
FIG. 8D shows the top wall panel of FIG. 8a in its fully closed position.
Figure 9:
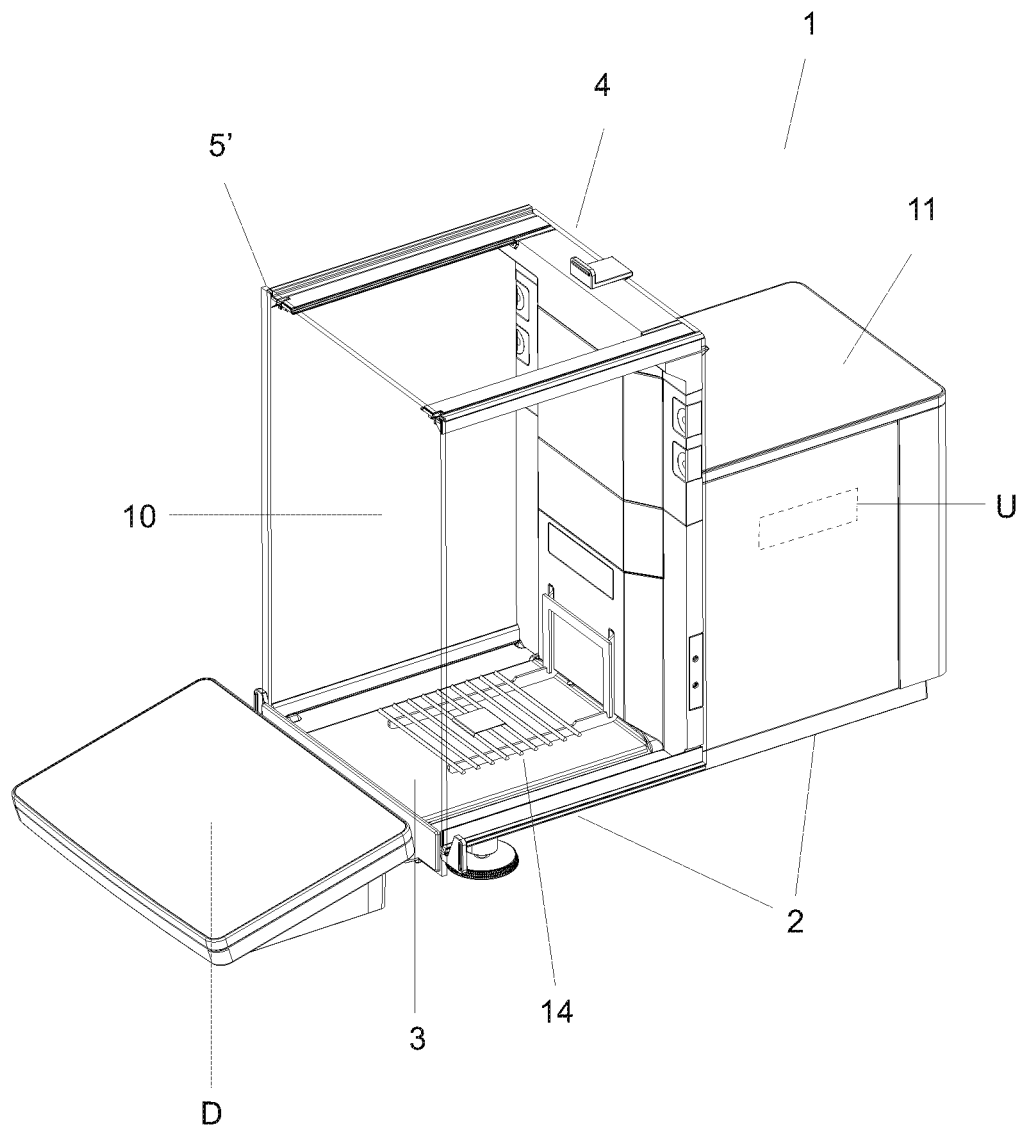
FIG. 9 represents a complete laboratory balance analogous to FIG. 1, but with a tall weighing chamber and an inserted additional module of the weighing chamber rear wall, in a perspective view.

FIGS. 8a to 8d show the top wall panel 6 in four different positions relative to the top module 16" of the weighing chamber rear wall 4: In FIG. 8a, the top wall panel 6 is out of engagement with the drive unit 19, but it is lined up for insertion of the edge guides 24 into the guide channels 68. In FIG. 8b, the edge guides 24 have been inserted into the guide channels 68, and the racks 75 (not visible here) on the undersides of the edge guides 24 are engaged with the pinions 62 of the drive unit 19. The top wall panel 6 is now in its normal open position. In FIG. 8c, the top wall panel 6 has been moved forward to an intermediate, half-open position. In FIG. 8d, the top wall panel 6 has been moved to its fully closed position, were further forward movement of the top wall panel 6 is blocked by the downward projection of the slide handle 74 (see FIG. 7b) bumping against the top module 16" of the weighing chamber rear wall 4.

Figure 10:
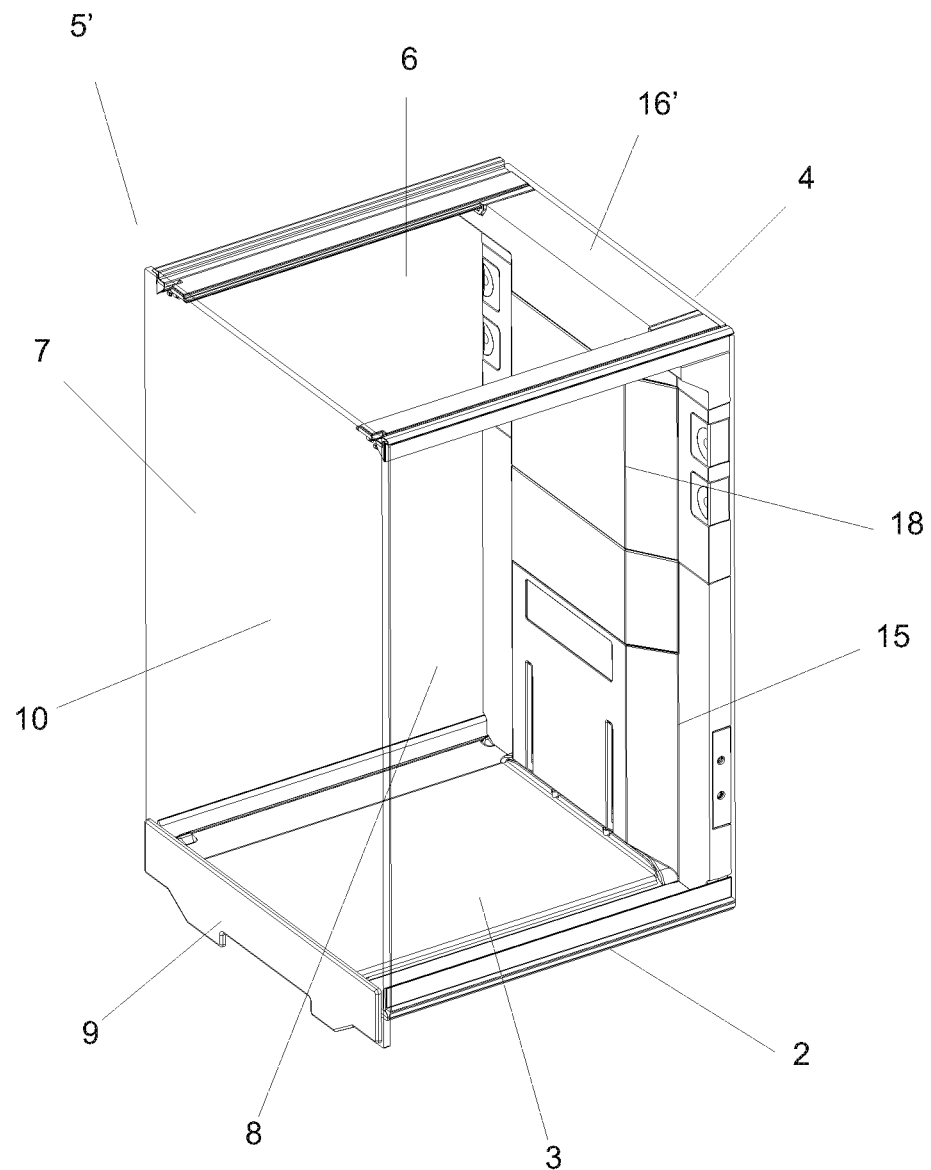
FIG. 10 represents the draft shield of the laboratory balance of FIG. 9, in a perspective view.
Figure 11:
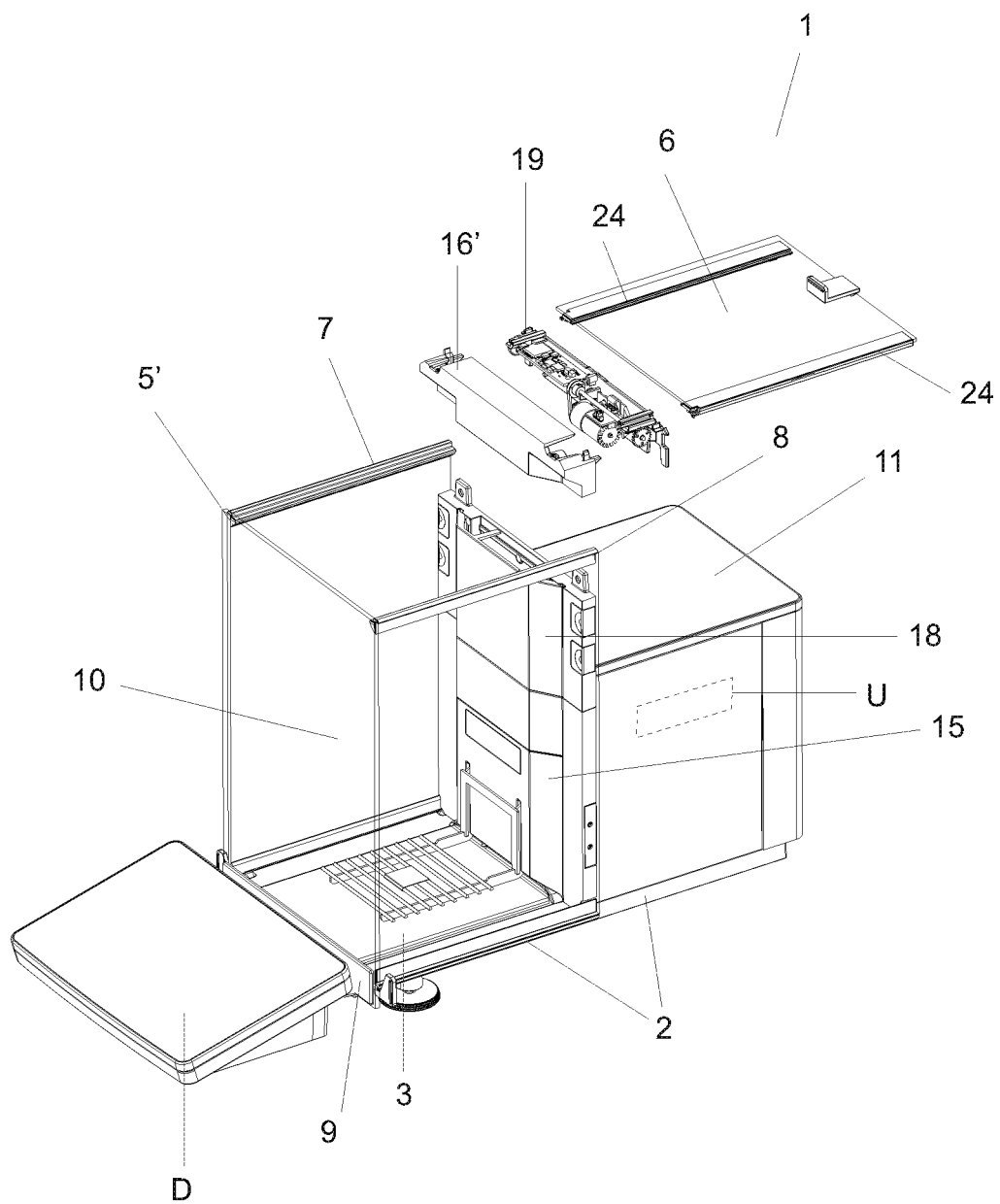
FIG. 11 represents the balance of FIG. 9, showing the top module of the rear wall, the drive unit, and the top wall panel in exploded view.

FIGS. 9 to 13 show the same laboratory balance 1 as in FIG. 1, but equipped with a taller draft shield 5'. This modular substitution of the taller draft shield 5' is made possible by the insertion of an additional module 18 and by the use of a different top module 16' of the weighing chamber rear wall 4. As shown in FIG. 10, the additional module 18 is inserted between the base module 15 and the top module 16'. Proceeding to FIG. 11, the drive unit 19 is installed in the top module 16', and the latter is then mounted on top of the additional module 18. Finally, the top wall panel 6 is slid into the guide channels 68 of the drive unit 19 as explained above in the context of FIG. 3.

Figure 12:
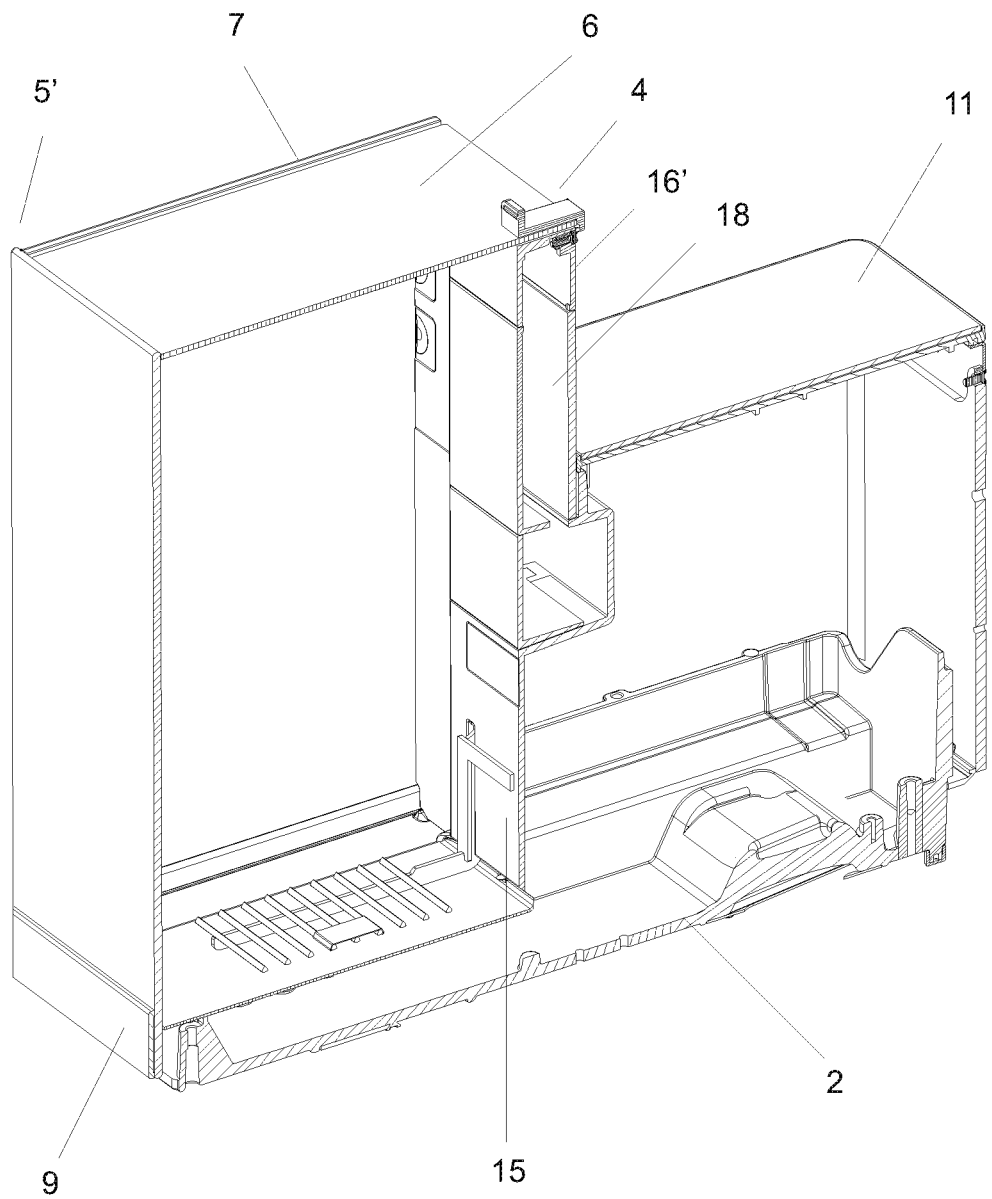
FIG. 12 shows a sectional view of the laboratory balance of FIG. 9 along a longitudinal vertical section plane.
Figure 13:
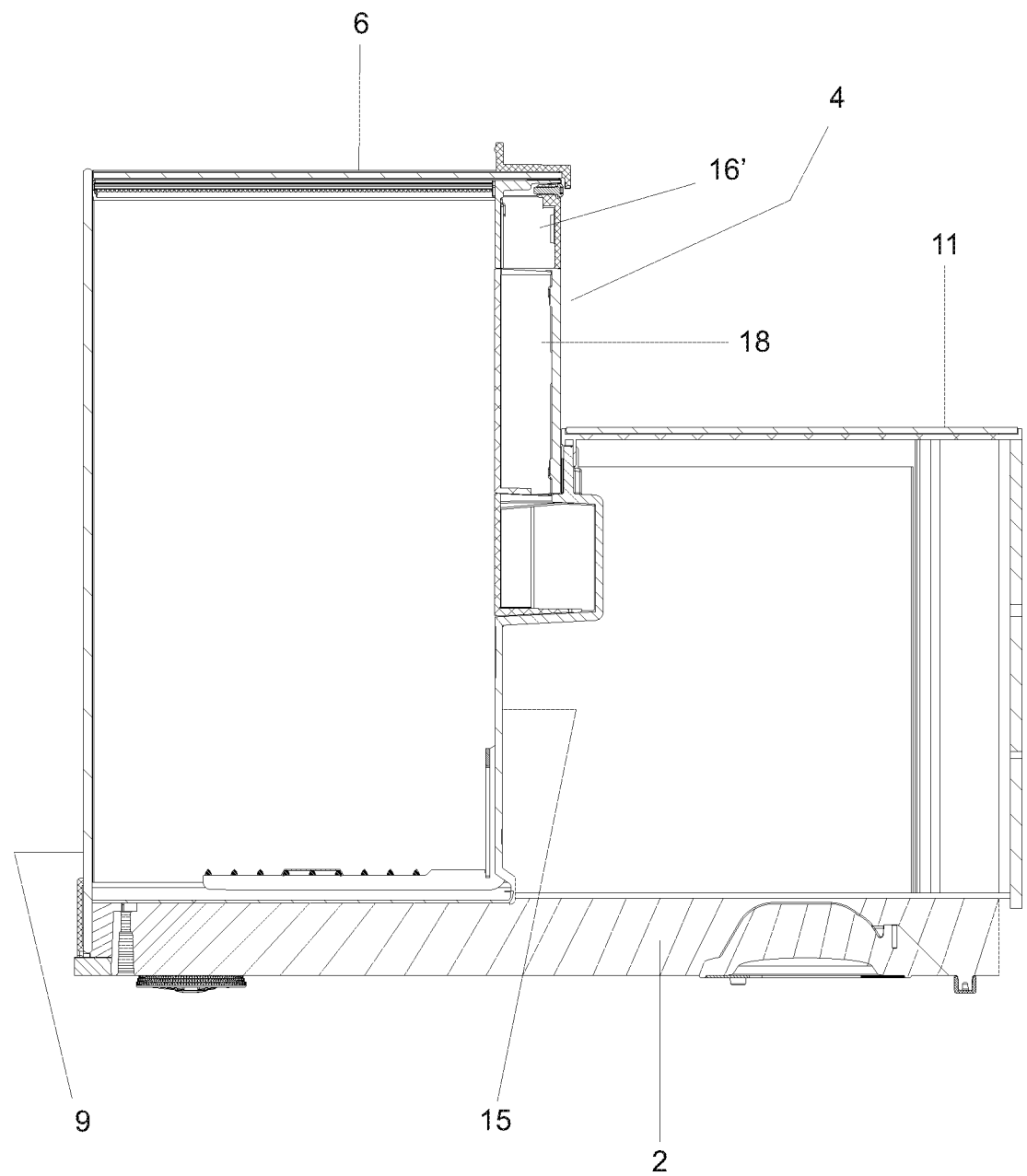
FIG. 13 shows a side view directed at the section plane of FIG. 12.

As illustrated in the perspective sectional view of FIG. 12 and the corresponding sectional elevation view of FIG. 13, the taller rear wall 4 with the additional module 18 and the top module 16' rises above the top surface of the housing 11. To present a satisfactory appearance towards the rear, as well as to conceal and enclose the electrical wiring of the power and control lines leading from the housing 11 to the drive unit 19, the additional module 18 and the top module 16' are configured as enclosed compartments whose backsides form part of the exterior wall surface of the laboratory balance 1.

Figure 14:
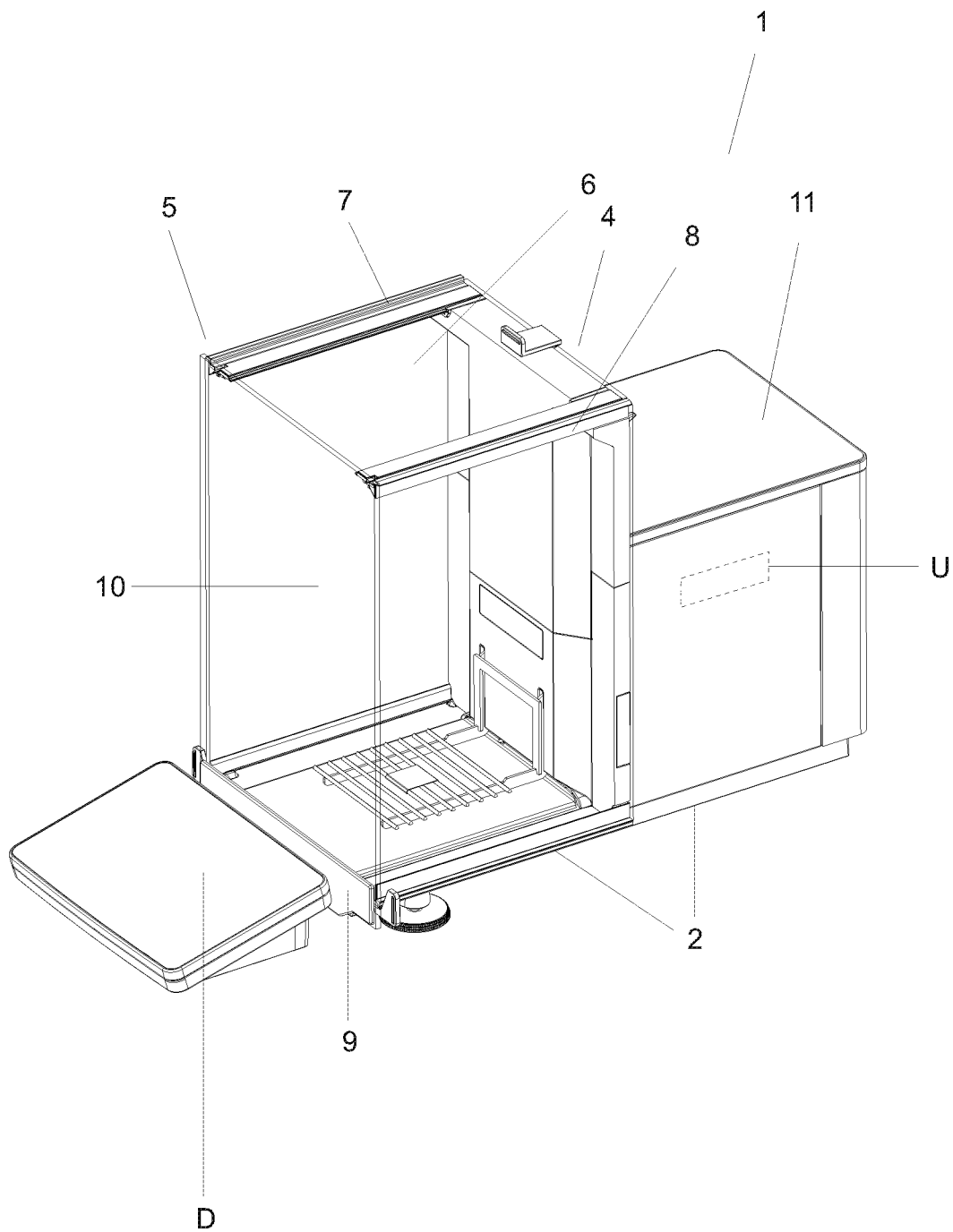
FIG. 14 represents a laboratory balance with a tall draft shield analogous to FIG. 9, but with a tall top module of the weighing chamber rear wall instead of using an inserted additional module.
Figure 15:
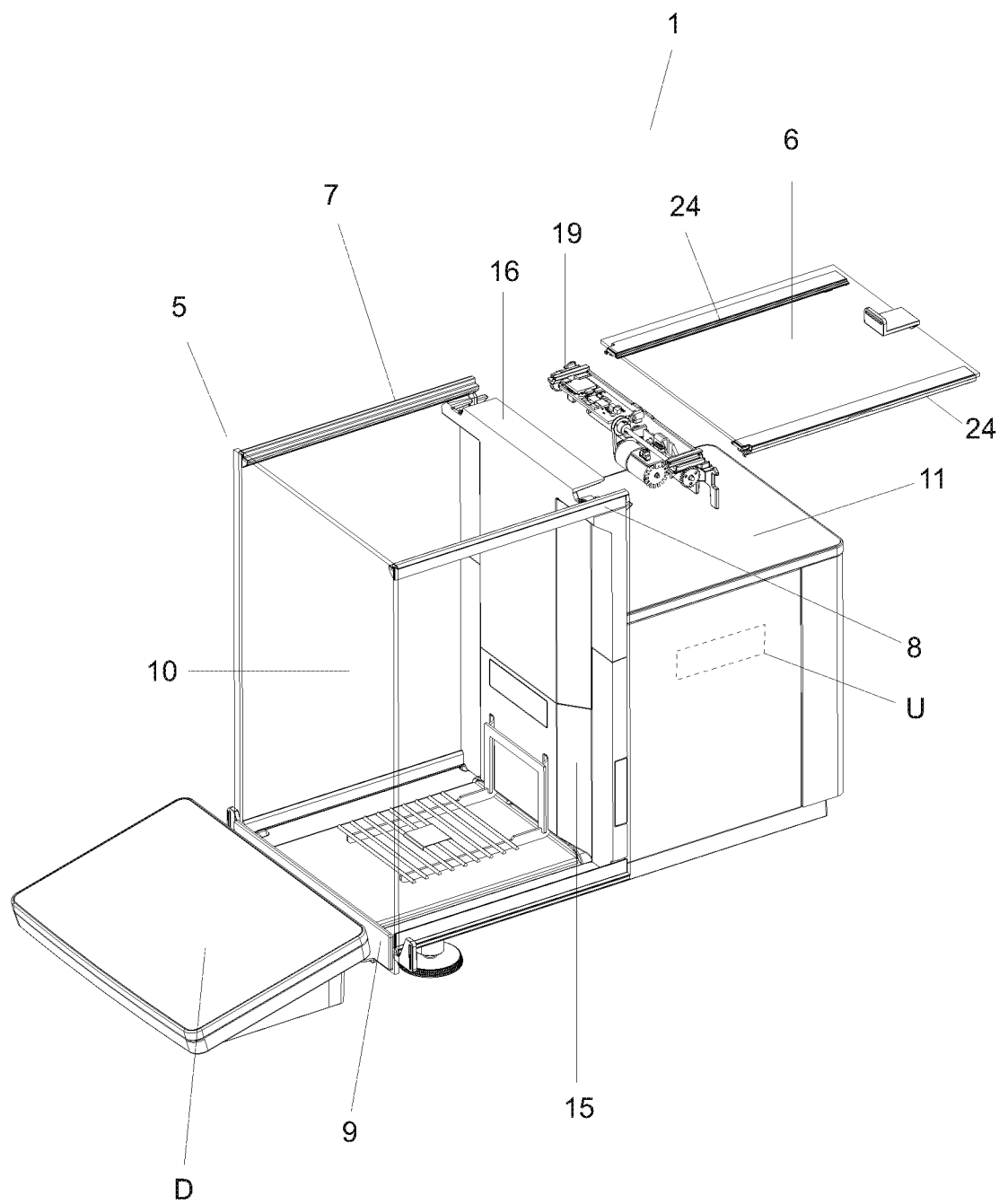
FIG. 15 represents the balance of FIG. 14, showing the drive unit and the top wall panel separated from the top module of the weighing chamber rear wall, in an exploded view.

FIGS. 14 and 15 again show the same laboratory balance 1, equipped with a taller draft shield analogous to FIGS. 9 to 13, but with a tall top module 16 of the weighing chamber rear wall 4 instead of using an inserted additional module 18. The tall top module 16, like the top modules 16" and 16', is designed for the installation of the drive unit 19.

To summarize the concept (but without implying any limitation) of the present invention, the drive unit 19 can be installed in different top modules exemplified by the top modules 16", 16' and 16, as has been described and illustrated herein, so that a laboratory balance 1 can be equipped with draft shields of different heights as exemplified by the draft shields 5", 5' and 5.

While the invention has been described through the presentation of specific examples in which a drive unit for a sliding top wall panel of a balance draft shield is installed in a top module of a weighing chamber rear wall of modular construction, it is considered self-evident that numerous additional variants are encompassed by the teachings of the present invention. For example, instead of the illustrated rack and pinion arrangement, the sliding top wall panel could be moved by friction wheels mounted on a transverse shaft of a transmission unit and in frictional surface contact with the underside of the top wall panel. It is considered self-evident that such combinations and variations of the modular concept for the arrangement of the drive unit of a sliding top wall panel of a balance draft shield are considered to fall within the scope of protection that is hereby sought for the present invention.

What is claimed is:

1. A laboratory balance, comprising:
 a base body;
 a weighing chamber with a floor and a rear wall;

a draft shield with a front wall, a top wall, a first side wall and a second side wall that is parallel to the first side wall, such that weighing chamber floor and rear wall, together with the draft shield, enclose the weighing chamber; and a drive unit, operatively connected to the top wall to actuate opening and closing movements of the top wall, wherein the weighing chamber rear wall comprises:

a base module connected to the base body; and a top module connected to the top wall, with at least a portion of the top module configured as a compartment in which the drive unit is arranged.

2. The laboratory balance of claim 1, wherein the drive unit is arranged in a transverse orientation within the compartment-shaped portion of the top module.

3. The laboratory balance of claim 1, wherein the drive unit is substantially enclosed within the top module.

4. The laboratory balance of claim 1, wherein the drive unit is arranged in a transverse orientation within the top module.

5. The laboratory balance of claim 1, wherein the drive unit comprises a mounting plate, a motor, a control circuit, and a transmission unit.

6. The laboratory balance of claim 5, wherein the motor, the control circuit, and the transmission unit are installed on the mounting plate.

7. The laboratory balance of claim 6, wherein the mounting plate is connected to the top module in a manner to positively position the drive unit in relation to the top module.

8. The laboratory balance of claim 6, further comprising:

at least a shaft of the transmission arranged to rotate about a horizontal axis, a driven pulley fixedly mounted on the shaft;

a belt connecting the driven pulley to a driver pulley of the motor; and at least one driving member fixedly mounted on the shaft.

9. The laboratory balance of claim 8, further comprising:

at least one guide on the top wall, interactively coupled to the at least one driving member.

10. The laboratory balance of claim 9, further comprising:

a pinion gear on the at least one driving member;

wherein the at least one guide comprises a rack that extends longitudinally along the top wall and interacts with the pinion for actuating the opening and closing movements of the top wall.

11. The laboratory balance of claim 5, further comprising:

a central control unit connected to the control circuit, the control circuit being operable to receive command signals from the central control unit and to control the movements of the motor based on the command signals.

* * * * *